United States Patent
Kim

(10) Patent No.: US 10,514,274 B2
(45) Date of Patent: Dec. 24, 2019

(54) DEVICE AND METHOD OF ESTIMATING ROTOR ANGLE IN MOTOR

(71) Applicant: Hyundai Mobis Co., Ltd., Seoul (KR)

(72) Inventor: Sang Min Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 276 days.

(21) Appl. No.: 15/636,571

(22) Filed: Jun. 28, 2017

(65) Prior Publication Data

US 2018/0052009 A1 Feb. 22, 2018

(30) Foreign Application Priority Data

Aug. 17, 2016 (KR) .................. 10-2016-0104221

(51) Int. Cl.
*G01D 5/16* (2006.01)
*H02K 11/215* (2016.01)

(52) U.S. Cl.
CPC ............ *G01D 5/16* (2013.01); *H02K 11/215* (2016.01)

(58) Field of Classification Search
CPC ...................................... G01D 5/16
USPC ................................................ 324/207.21
See application file for complete search history.

(56) References Cited

U.S. PATENT DOCUMENTS

| | | | | |
|---|---|---|---|---|
| 6,703,809 B2* | 3/2004 | Royak | ............ | H02P 6/185 318/727 |
| 7,245,104 B2* | 7/2007 | Tomigashi | ............ | H02P 21/22 318/700 |
| 2009/0301223 A1* | 12/2009 | Sihler | ............ | G01L 3/102 73/862.333 |
| 2010/0188033 A1* | 7/2010 | Daboussi | ............ | H02P 21/34 318/400.34 |
| 2014/0035493 A1* | 2/2014 | Ajima | ............ | H02P 6/12 318/400.04 |

* cited by examiner

*Primary Examiner* — Christopher E Mahoney
(74) *Attorney, Agent, or Firm* — H.C. Park & Associates, PLC

(57) ABSTRACT

Provided is a device for estimating a rotor angle in a motor. The device includes a sensor configured to measure a rotation angle "$\theta_{in}$" of a motor including a pulsation, a D-Q converter configured to convert the rotation angle "$\theta_{in}$" into a D-axis conversion angle, and a phase-locked loop (PLL) block configured to perform proportional integral control on the D-axis conversion angle according to a PLL algorithm to estimate a rotation angle "$\theta_{out}$" from which the pulsation has been removed.

8 Claims, 10 Drawing Sheets

DEVICE AND METHOD OF ESTIMATING ROTOR ANGLE IN MOTOR

CROSS-REFERENCE TO RELATED APPLICATIONS

This application claims priority from and the benefit of Korean Patent Application No. 10-2016-0104221, filed on Aug. 17, 2016, which is hereby incorporated by reference for all purposes as if set forth herein.

BACKGROUND

Field

Exemplary embodiments relate to a method of estimating a rotor angle in a motor, and more particularly, to a method of estimating a rotor angle (or a rotor position) in a motor.

Discussion of the Background

Sensors for measuring an angle of a rotor or a rotation velocity of the rotor are needed for driving a synchronous motor or an induction motor in a vector control method.

Generally, encoders or resolvers are being widely used as sensors for measuring an angle of a rotor or a rotation velocity of the rotor.

Sensors such as the encoders or the resolvers are relatively precise and are less affect by disturbance such as vibration and a magnetic field, but are expensive.

Therefore, expensive sensors being applied to a motor system estimating a rotor angle of a motor causes a reduction in price competitiveness.

The above information disclosed in this Background section is only for enhancement of understanding of the background of the invention and, therefore, it may contain information that does not constitute prior art.

SUMMARY

Exemplary embodiments of the present invention provide a device and method of estimating a rotor angle of a motor by using a low-cost giant magneto resistance (GMR) sensor.

In one general aspect, a device for estimating a rotor angle in a motor includes: a sensor configured to measure a rotation angle "$\theta_{in}$" of a motor including a pulsation; a D-Q converter configured to convert the rotation angle "$\theta_{in}$" into a D-axis conversion angle; and a phase-locked loop (PLL) block configured to perform proportional integral control on the D-axis conversion angle according to a PLL algorithm to estimate a rotation angle "$\theta_{out}$" from which the pulsation has been removed.

In another general aspect, a method of estimating a rotor angle in a motor includes: measuring a rotation angle "$\theta_{in}$" of the motor including a pulsation by using a sensor; converting the rotation angle "$\theta_{in}$" into a D-axis conversion angle representable in a DQ-axis coordinate system; and performing proportional integral control on the D-axis conversion angle to estimate a rotation angle "$\theta_{out}$" from which the pulsation has been removed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
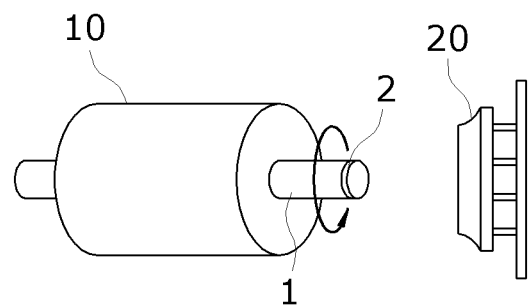
FIGS. 1 and 2 are diagrams illustrating a disposition structure between a motor and a GMR sensor applied to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

The present invention provides a motor system which estimates a rotation angle of a rotor by using a low-cost GMR sensor, for reducing the price of a motor system estimating a rotation angle of a rotor by using an expensive sensor.

Moreover, the present invention provides an algorithm which removes a pulsation, which is included in an angle measurement value and is caused by a magnetic flux interference or shaft misalignment, by using a GMR sensor.

Hereinafter, exemplary embodiments of the present invention will be described in detail with reference to the accompanying drawings.

Figure 2:
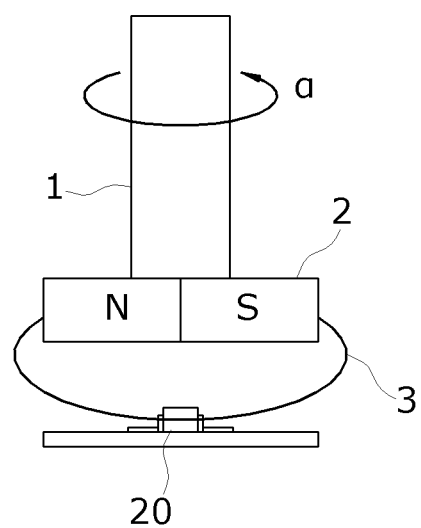

FIGS. 1 and 2 are diagrams illustrating a disposition structure between a motor and a GMR sensor applied to an embodiment of the present invention.

Referring to FIGS. 1 and 2, a motor 10 may include a shaft 1 which transfers power.

A GMR sensor 20 may be spaced apart from one end of the shaft 1 by a certain interval.

A permanent magnet 2 may be attached on an end of the shaft 1, in order for the GMR sensor 20 to measure an angle of a rotor necessary for controlling a torque or a velocity of the motor 10.

A magnetization direction of the permanent magnet 2 may be a direction vertical to the shaft 1.

Figure 3:
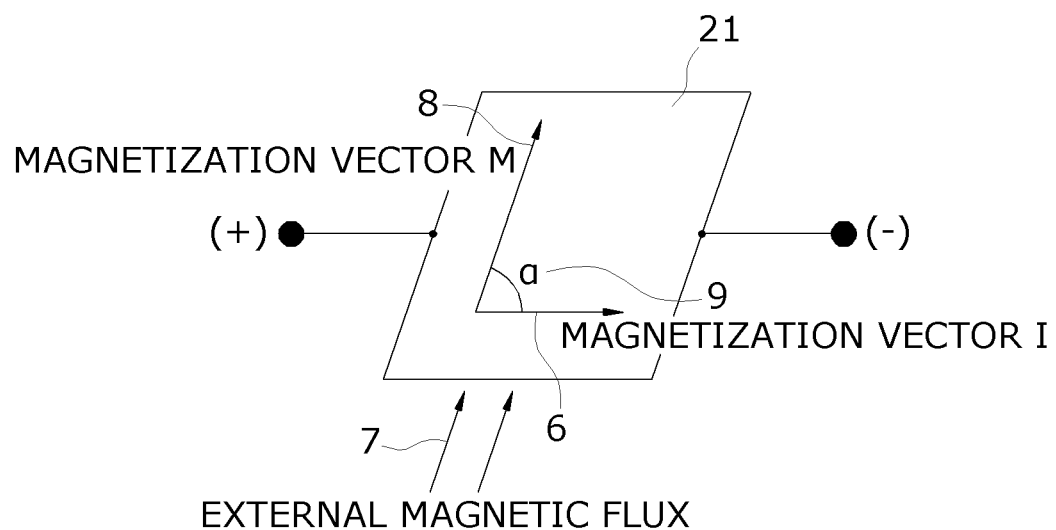
FIG. 3 is a diagram illustrating the angle detection principle of the GMR sensor illustrated in FIGS. 1 and 2.

FIG. 3 is a diagram illustrating the angle detection principle of the GMR sensor 20 illustrated in FIGS. 1 and 2.

Referring to FIG. 3, when a magnet flux (3 of FIG. 1) generated from the permanent magnet 2 is applied to the GMR sensor 20, a resistance value R of a ferromagnetic alloy 21 included in the GMR sensor 20 may vary. The ferromagnetic alloy 21 may be, for example, a permalloy.

The resistance value "R" may be represented by a current vector "I" 6 flowing in the ferromagnetic alloy 21 and an included angle "α" of a magnetization vector "M" 8 based on an external magnetic flux 7. A relationship between the resistance value "R" and the included angle "α" may be expressed as the following Equation (1):

$$R = R_0 + R_0 \cos^2(\alpha) \quad \text{Equation (1)}$$

α=0, maximum in resistance value
α=90, maximum in resistance value where $R_0$ denotes an initial resistance value of the ferromagnetic alloy 21.

Figure 4:
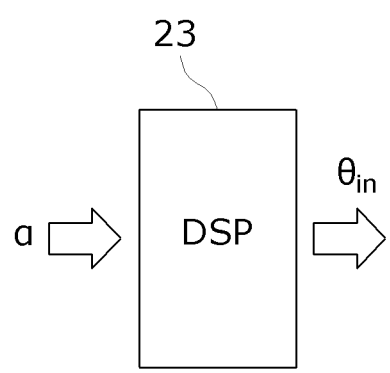
FIG. 4 is a diagram illustrating an input and an output of a digital signal processor (DSP) built into the GMR sensor.

FIG. 4 is a diagram illustrating an input and an output of a digital signal processor (DSP) 23 built into a GMR sensor of the related art.

Referring to FIG. 4, when the included angle "α" calculated from Equation (1) is input to the DSP 23, the DSP 23 may perform a processing operation of estimating a rotation angle "$\theta_{in}$" from the included angle "α".

Figure 5:
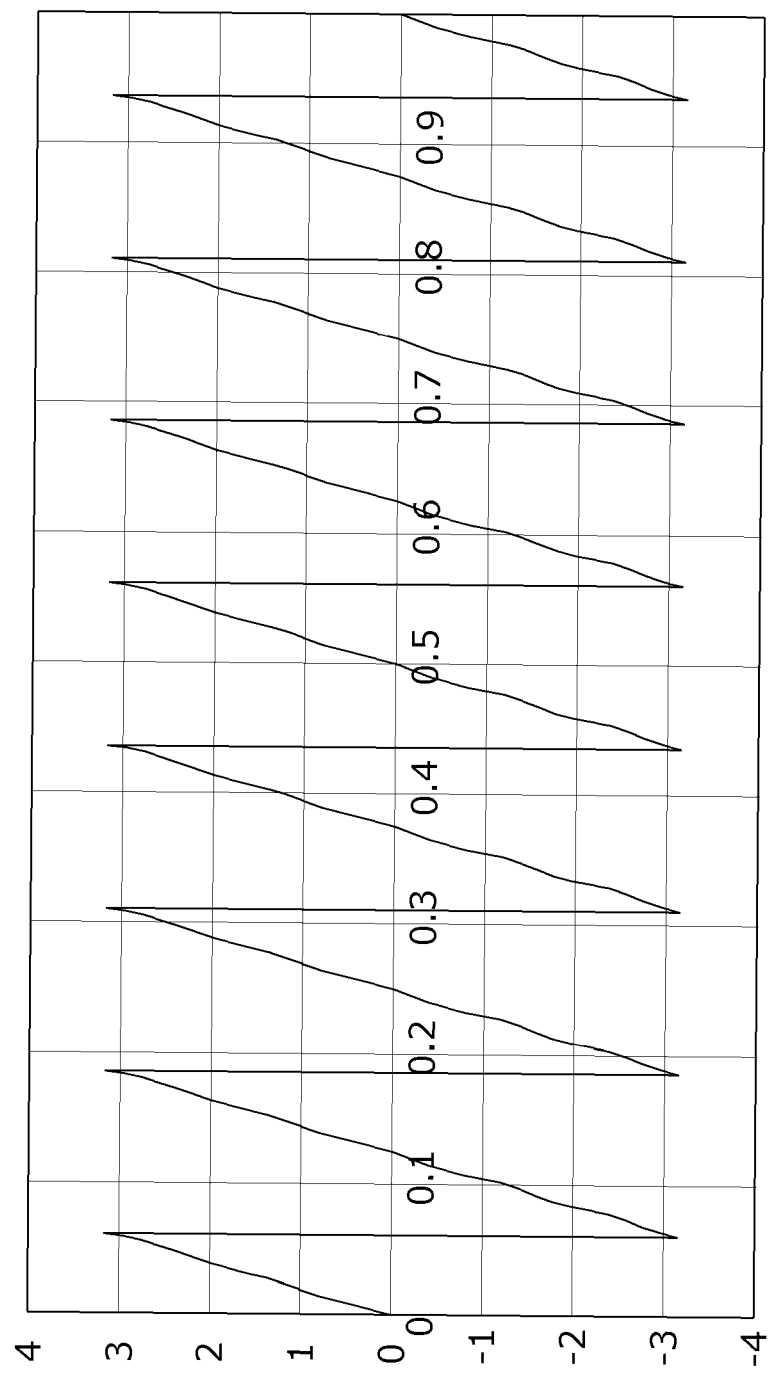
FIG. 5 is a waveform diagram showing a pulsation component included in an output of the GMR sensor.

FIG. 5 is a waveform diagram showing a pulsation component included in an output of a GMR sensor of the related art.

Referring to FIG. 5, an external magnetic flux is applied between the permanent magnet 2 and the GMR sensor 20, and for this reason, interference can occur, or the bending or shaft misalignment of a shaft 1 can occur. In this case, a pulsation can occur in an output pulse of the GMR sensor 20.

That is, despite a rotation of a rotor being constant, as shown in FIG. 5, the pulsation is shown as a waveform which moves upward and downward without increasing in an increase period of each output pulse of the GMR sensor 20. The pulsation causes an error of a rotation angle measured by the GMR sensor 20.

Hereinafter, a detailed method of removing a pulsation by using a PLL algorithm according to an embodiment of the present invention will be described in detail.

Figure 6:
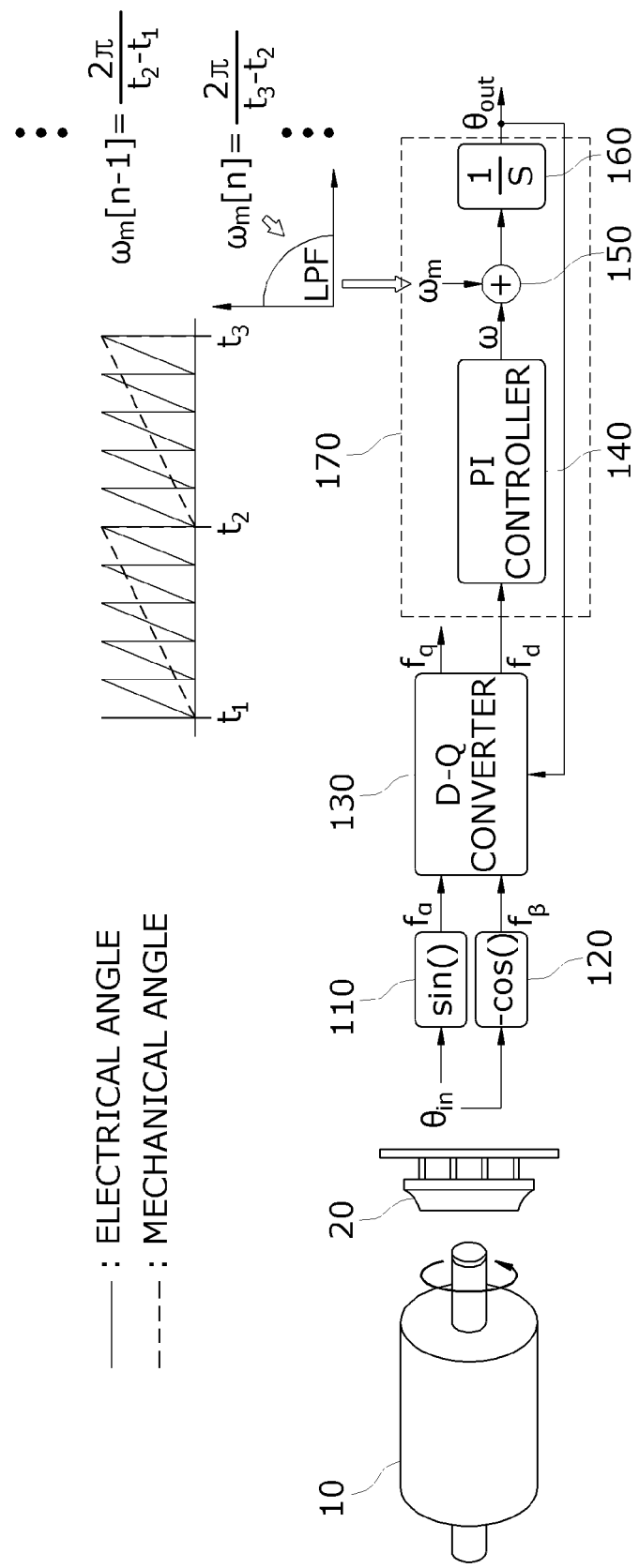
FIG. 6 is a block diagram illustrating an internal configuration of a signal processing unit for removing a pulsation included in a rotation angle measured by the GMR sensor according to an embodiment of the present invention.

FIG. 6 is a block diagram illustrating an internal configuration of a signal processing unit for removing a pulsation included in a rotation angle measured by the GMR sensor according to an embodiment of the present invention.

Referring to FIG. 6, the signal processing unit may include a sine value calculator 110, a cosine value calculator 120, a D-Q converter 130, and a PLL block 170. The PLL block 170 may include a proportional integral (PI) controller 140, an adder 150, and an integrator 160.

A rotation angle "$\theta_{in}$" measured by the GMR sensor 20 may be input to the sine value calculator 110 and the cosine value calculator 120. Here, the rotation angle "$\theta_{in}$" may include a first rotation angle "$\theta_{exact}$" including no pulsation and a second rotation angle "$\theta_{ripple}$" including a pulsation which occurs in an increase period of an output pulse, which is a measurement result of the GMR sensor 20, as shown in FIG. 5. This is expressed as "$\theta_{in} = \theta_{exact} + \theta_{ripple}$".

The sine value calculator 110 may calculate a sine value "$f_\alpha$" of the input rotation angle "$\theta_{in}$" by using a sine function "sin( )". This may be expressed as "$f_\alpha = \sin(\theta_{in})$". The calculated sine value "$f_\alpha$" may be input to the D-Q converter 130.

The cosine value calculator 120 may calculate a negative (−) cosine value "$f_\beta$" of the input rotation angle "$\theta_{in}$" by using a cosine function "cos( )". This may be expressed as "$f_\beta = -\cos(\theta_{in})$". The calculated cosine value "$f_\beta$" may be input to the D-Q converter 130.

The D-Q converter 130 may respectively rotation-convert the input since value "$f_\alpha = \sin(\theta_{in})$" and the input cosine value "$f_\beta = -\cos(\theta_{in})$" into a D-axis conversion angle "$f_d$" and a Q-axis conversion angle "$f_q$" representable on a DQ axis by using a rotation conversion matrix. This may be expressed as the following Equation (2):

$$\begin{bmatrix} f_d \\ f_q \end{bmatrix} = \begin{bmatrix} \cos(\theta_{out}) & \sin(\theta_{out}) \\ -\sin(\theta_{out}) & \cos(\theta_{out}) \end{bmatrix} \begin{bmatrix} \sin(\theta_{in}) \\ -\cos(\theta_{in}) \end{bmatrix} \quad \text{Equation (2)}$$

$$= \begin{bmatrix} \cos(\theta_{out})\sin(\theta_{in}) - \sin(\theta_{out})\cos(\theta_{in}) \\ -\sin(\theta_{out})\sin(\theta_{in}) - \cos(\theta_{out})\cos(\theta_{in}) \end{bmatrix}$$

where $$\begin{bmatrix} \cos(\theta_{out}) & \sin(\theta_{out}) \\ -\sin(\theta_{out}) & \cos(\theta_{out}) \end{bmatrix}$$

denotes a rotation conversion matrix based on an output angle "$\theta_{out}$" of the PLL block 170.

The D-axis conversion angle "$f_d$" among results obtained through conversion by the D-Q converter 130 may be expressed as the following Equation (3):

$$f_d = \cos(\theta_{out})\sin(\theta_{in}) - \sin(\theta_{out})\cos(\theta_{in}) \quad \text{Equation (3)}$$

$$= \sin(\theta_{in} - \theta_{out}) \simeq \theta_{in} - \theta_{out}$$

According to Equation (3), the D-axis conversion angle "fd" may be expressed as "$\sin(\theta_{in} - \theta_{out})$", based on a trigonometric function relational formula, and when a difference between the rotation angle "$\theta_{in}$" measured by the GMR sensor 20 and the output angle "$\theta_{out}$" of the PLL block 170 is small, the D-axis conversion angle "fd" may be approximated to "$\theta_{in}-\theta_{out}$". "$\theta_{in}-\theta_{out}$" may be regarded as an estimation error and may be input to the PI controller 140.

The PI controller 140 may perform PI control (control for decreasing to 0) for decreasing an estimation error of the conversion angle "fd" with respect to the input D-axis conversion angle "fd" to calculate a rotor angular velocity "$\omega$" which is controlled in order for the output angle "$\theta_{out}$" of the PLL block 170 to track the rotation angle "$\theta_{in}$" measured by the GMR sensor 20, and may input the calculated rotor angular velocity "$\omega$" to the adder 150.

The adder 150 may summate the input rotor angular velocity "$\omega$" and a synchronous velocity "$\omega_m$" to calculate a sum value "$\omega+\omega_m$", and the sum value "$\omega+\omega_m$" may be input to the integrator 160. Here, the synchronous velocity "$\omega_m$" may be an electrical rotor angular velocity of the motor 10 and may be calculated from the rotation angle "$\theta_{in}$" measured by the GMR sensor 20.

In detail, by using a low pass filter (LPF), the synchronous velocity "$\omega_m$" may be calculated by filtering a frequency of an output pulse, representing the rotation angle "$\theta_{in}$" measured by the GMR sensor 20, and a rotor angular velocity calculated from a stimulus number of the motor 10. An operation of calculating the synchronous velocity "$\omega_m$" may be performed by a microcomputer (not shown).

The synchronous velocity "$\omega_m$" may be calculated from the number of stimuluses and a frequency of an output pulse irrelevant to a pulsation component included in an output pulse output from the GMR sensor 20, and thus, may be used as a reference value for decreasing an estimation error.

The integrator 160 may integrate the sum value obtained by summating the rotor angular velocity "$\omega$" and the synchronous velocity "$\omega_m$" to calculate a rotation angle "$\theta_{out}$" of the rotor having a reduced estimation error, namely, a rotation angle "$\theta_{out}$" of the rotor having a high frequency pulsation component which is included in the rotation angle "$\theta_{in}$" of the rotor measured by the GMR sensor 20 and has been reduced. A series of processing operations by performed by the elements 140, 150, and 160 may be repeated until the calculated rotation angle "$\theta_{out}$" of the rotor may be fed back to the D-Q converter 130 and the high frequency pulsation component included in the rotation angle "$\theta_{in}$" of the rotor measured by the GMR sensor 20 is completely removed.

As described above, due to a tracking capability of the PLL block 170 including the PI controller 140, the rotation angle "$\theta_{out}$" output from the PLL block 170 may track the rotation angle "$\theta_{in}$" of the rotor measured by the GMR sensor 20.

That is, the output of the PLL block 170 may track an input value which linearly increases in a synchronous coordinate system (or a DQ-axis coordinate system) rotating identically to an electrical angular velocity. In this case, the high frequency pulsation component included in the rotation angle "$\theta_{in}$" measured by the GMR sensor 20 is removed from the rotation angle "$\theta_{out}$" of the rotor output from the PLL block 170. A PLL structure of the PLL block 170 may match a quadrature PLL structure.

Figure 7:
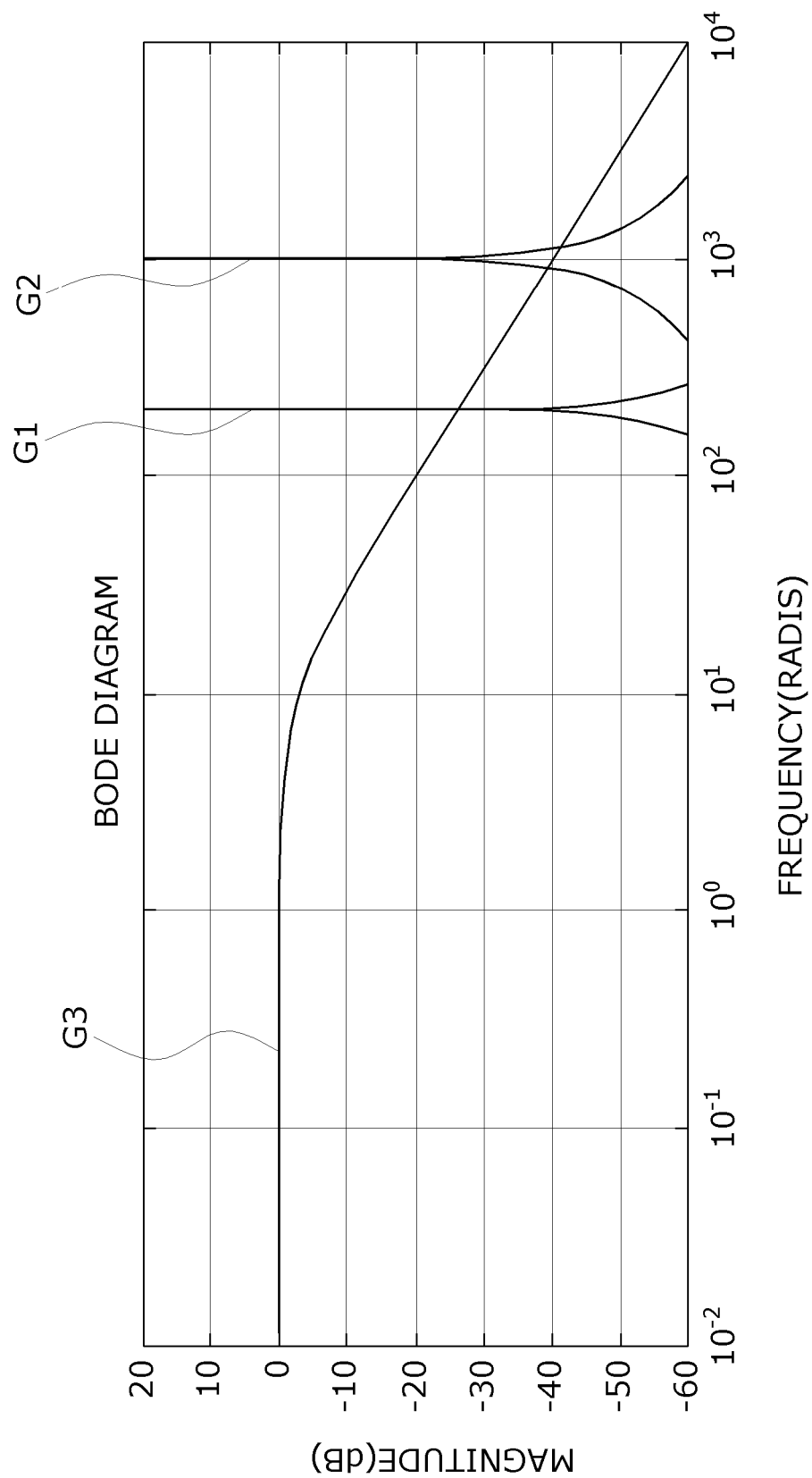
FIGS. 7 and 8 are bode diagrams advantages when a phase-locked loop (PLL) is implemented according to an embodiment of the present invention.
Figure 8:
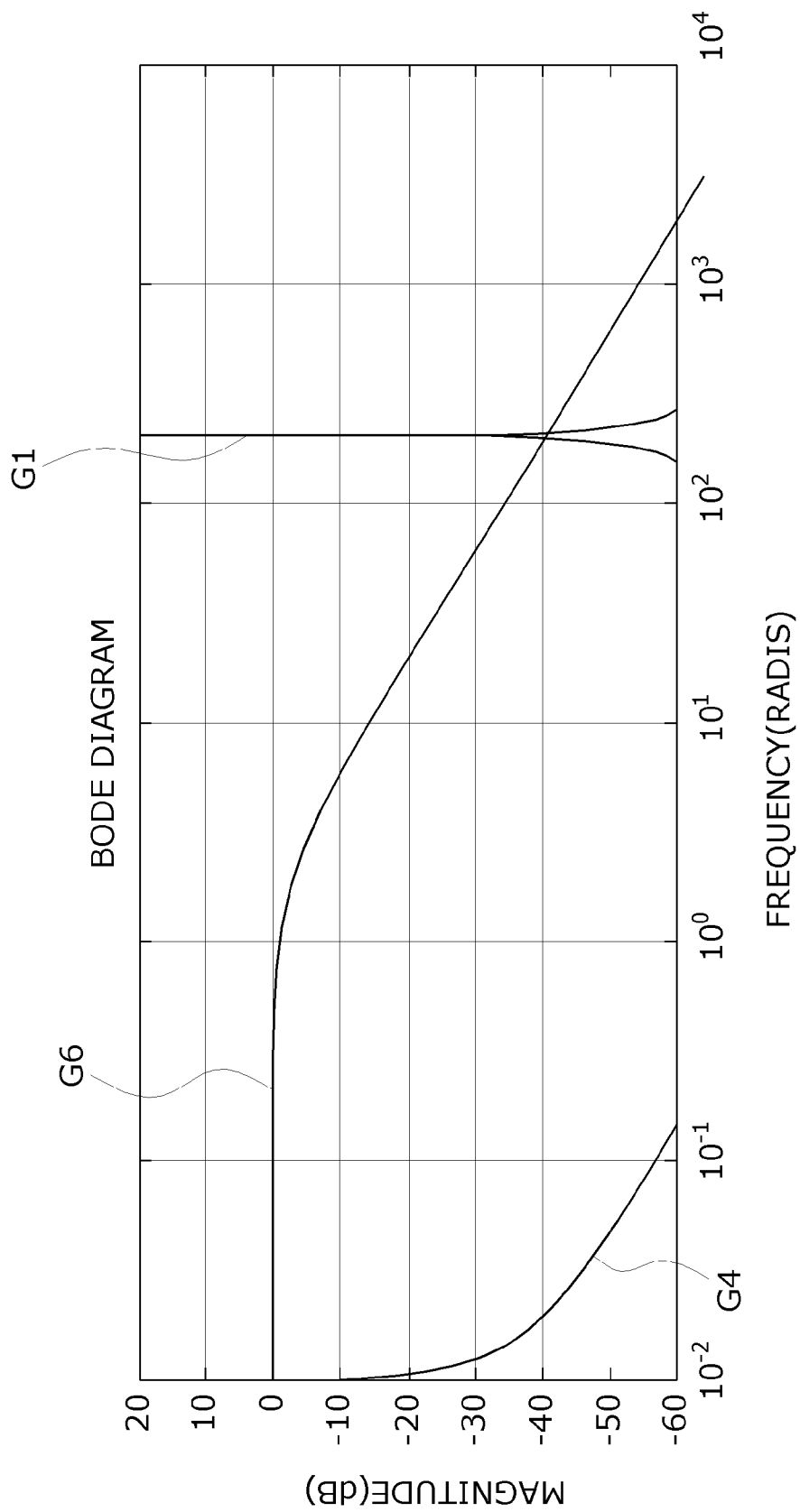

FIGS. 7 and 8 are bode diagrams advantages when a PLL is implemented according to an embodiment of the present invention.

In FIGS. 7 and 8, a graph G1 shows a pulsation frequency band which is ⅕ times a synchronous frequency of the synchronous velocity "$\omega_m$", and a graph G2 shows a frequency band of the synchronous velocity "$\omega_m$". Also, a graph G3 shows a frequency response with respect to a gain of a low pass filter (LPF).

The pulsation frequency band is shown at a period which is the same as that of a mechanical angle of the motor. For example, when the number of stimuluses of the motor is 2P and a synchronous frequency is $\omega_f$, a pulsation frequency "$\omega_\gamma$" may be expressed as the following Equation (4):

$$w_\gamma = w_f \times \frac{1}{P} \qquad \text{Equation (4)}$$

If a low pass filter having a frequency response shown in the graph G3 is designed for removing the pulsation frequency band by using a general PLL, a synchronous frequency band instead of the pulsation frequency band corresponds to a high frequency range, causing a problem where a synchronous frequency is removed.

On the other hand, by using a synchronous coordinate system PLL according to an embodiment of the present invention, the problem is solved. The synchronous coordinate system PLL may perform D-Q conversion on the synchronous frequency to move the synchronous frequency to a direct current (DC) frequency band as in a graph G4 of FIG. 8.

Since the pulsation frequency is not converted into a DC component by the D-Q conversion, as in the graph G1 of FIG. 8, the pulsation frequency is located in a band which is ⅕ times the synchronous frequency. In FIG. 8, a graph G6 shows a frequency response with respect to a gain of a low pass filter for removing the pulsation frequency band.

In the synchronous coordinate system PLL, unlike a case where the general PLL is applied, since the pulsation frequency instead of the synchronous frequency is located in the high frequency range, only the pulsation frequency is removed by using the low pass filter. That is, in a gain of the PI controller, a band value between a synchronous frequency band G4 converted into a DC frequency band and a pulsation frequency band 27 may be set to a cutoff frequency in order to remove a pulsation component included in the output pulse representing the rotation angle "$\theta_{in}$" measured by the GMR sensor.

As described above, by using the GMR sensor, when a pulsation is removed from an angle measured by the GMR sensor, controlling of the motor is stabilized, and enhanced motor control is made.

To this end, the applicant invents a method of removing a pulsation included in an angle measured by a GMR sensor, thereby stabilizing and enhancing an output of a motor. Such a result may be checked in FIGS. 9 to 11.

Figure 9:
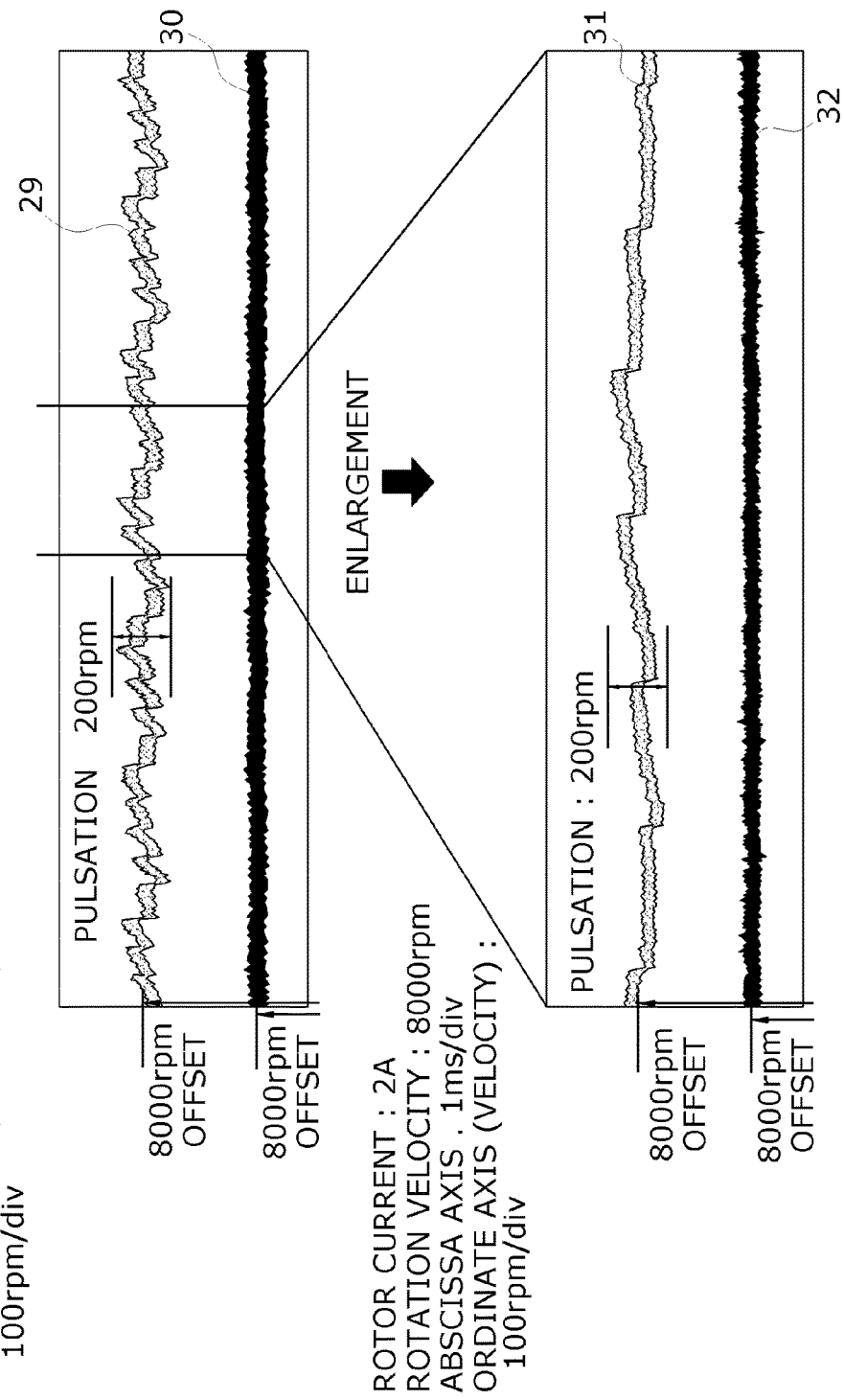
FIG. 9 is a waveform diagram showing rotation velocities obtained from a rotation angle of a rotor including a pulsation in the related art and a rotation angle of a rotor from which a pulsation has been removed in an embodiment of the present invention.

FIG. 9 is a waveform diagram showing rotation velocities obtained by differentiating a rotation angle of a rotor including a pulsation and a rotation angle of a rotor from which a pulsation has been removed in an embodiment of the present invention.

Referring to FIG. 9, a waveform 29 is a waveform showing a rotation velocity of a rotor including a pulsation of 200 rpm in the related art by differentiating a rotation velocity of a rotor measured by a GMR sensor, and a waveform 30 is a waveform showing a rotation velocity of a rotor, from which a pulsation has been removed, by differentiating a rotation velocity of a rotor measured by a GMR sensor by applying the PLL according to an embodiment of the present invention. A waveform 31 is a waveform obtained by enlarging the waveform 29 including the pulsation of 200 rpm, and a waveform 32 is a waveform obtained by enlarging the waveform 30 including no pulsation.

Figure 10:
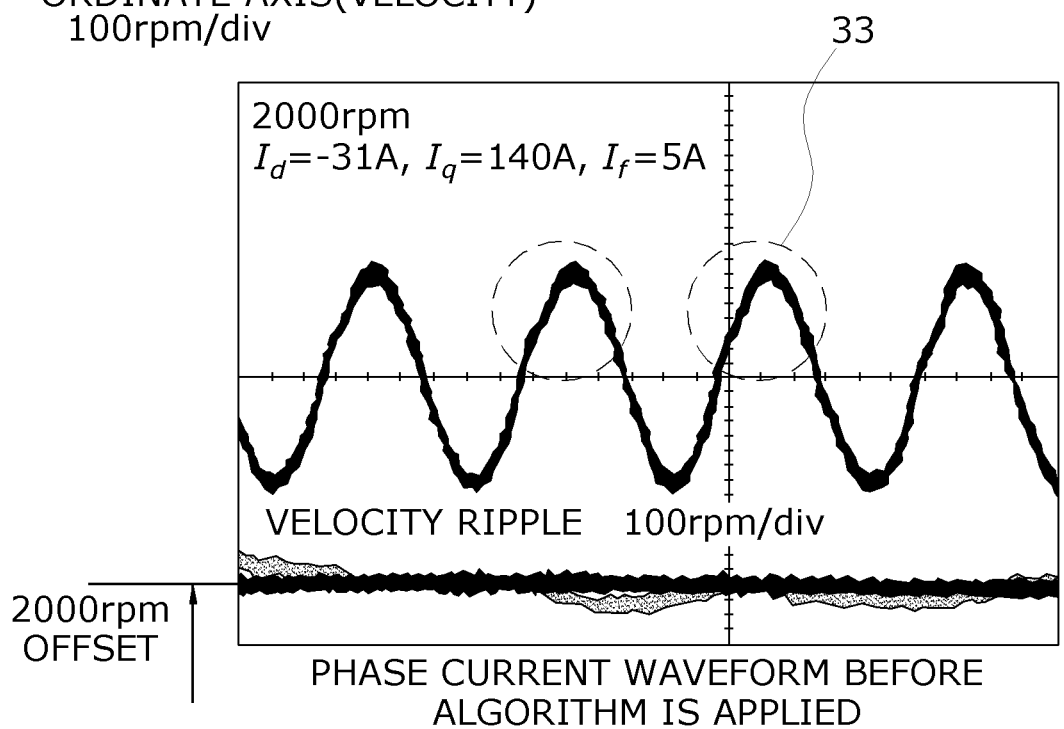
FIG. 10 is a phase current waveform of a motor shown when the motor is controlled based on a rotation angle including a pulsation, in the related art.

FIG. 10 is a phase current waveform of a motor shown when the motor is controlled based on a rotation angle including a pulsation.

Referring to FIG. 10, when a motor is controlled by using a rotation velocity including a pulsation, as seen in a waveform 33, it can be seen that distortion occurs in a phase current waveform.

Figure 11:
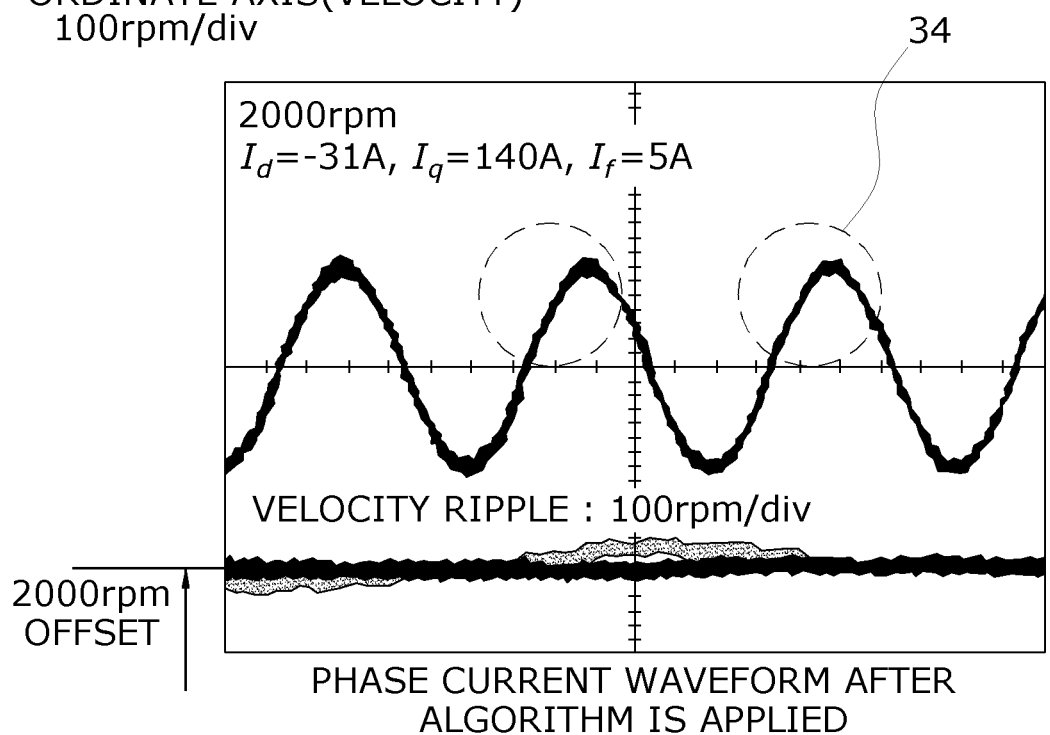
FIG. 11 is a phase current waveform of a motor shown when the motor is controlled based on a rotation angle from which a pulsation has been removed, in an embodiment of the present invention.

FIG. 11 is a phase current waveform of a motor shown when the motor is controlled based on a rotation angle from which a pulsation has been removed, in an embodiment of the present invention.

Referring to FIG. 11, when a motor is controlled based on a rotation angle from which a pulsation has been removed by using the PLL according to an embodiment of the present invention, as seen in a waveform 34, it can be seen that distortion is effectively removed from a phase current.

Figure 12:
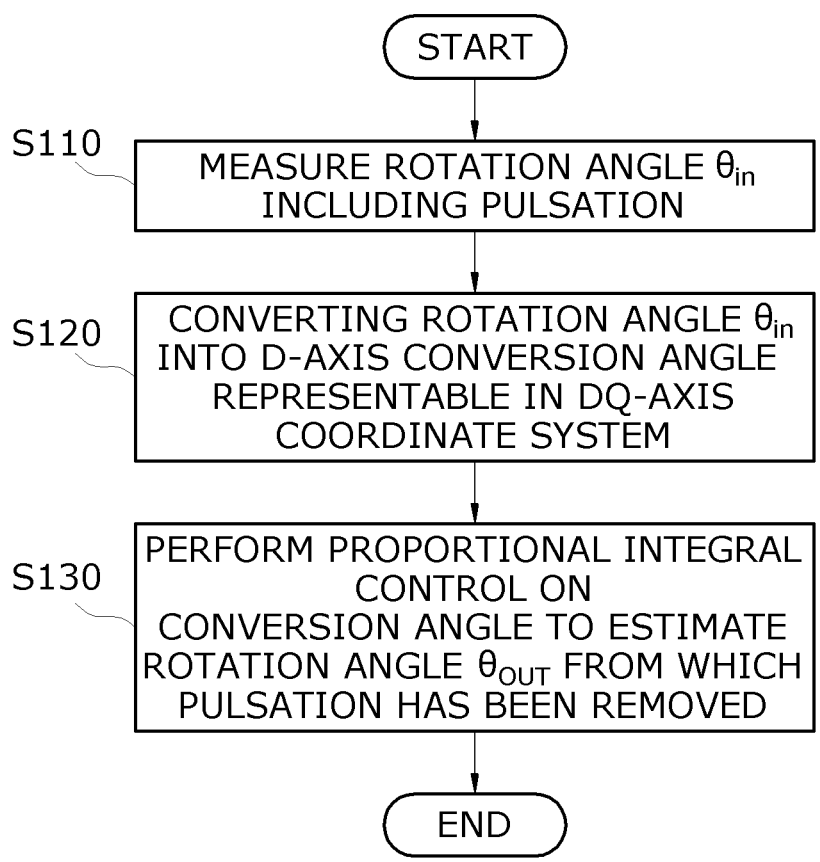
FIG. 12 is a flowchart illustrating a method of estimating a rotor angle in a motor according to an embodiment of the present invention.

FIG. 12 is a flowchart illustrating a method of estimating a rotor angle in a motor according to an embodiment of the present invention.

Referring to FIG. 12, first, in step S110, an operation of measuring a rotation angle "$\theta_{in}$" of a motor including a pulsation by using a sensor may be performed. A method of measuring the rotation angle "$\theta_{in}$" may use, for example, a giant magneto resistance (GMR) sensor.

Subsequently, in step S120, an operation of converting the rotation angle "$\theta_{in}$" into a D-axis conversion angle representable in a DQ-axis coordinate system may be performed. The converting operation may include an operation of feeding back the rotation angle "$\theta_{out}$", an operation of generating a rotation conversion matrix including a cosine function and a sine function for the rotation angle "$\theta_{out}$", and an operation of converting the rotation angle "$\theta_{in}$" into the D-axis conversion angle including an estimation error "$\theta_{in}-\theta_{out}$" between the rotation angle "$\theta_{in}$" and the rotation angle "$\theta_{out}$" by using the generated rotation conversion matrix.

Subsequently, in step S130, an operation of performing proportional integral control on the D-axis conversion angle to estimate a rotation angle "$\theta_{out}$" from which the pulsation has been removed may be performed. Here, a gain of the proportional integral control may be a gain when a band value between a frequency band of the synchronous velocity and a frequency band of the pulsation is set to a cutoff frequency. The estimating operation may include an operation of performing the proportional integral control for controlling an estimation error "$\theta_{in}-\theta_{out}$", included in the D-axis conversion angle, to 0 to calculate a rotor angular velocity "$\omega$" which is controlled for the rotation angle "$\theta_{out}$" to track the rotation angle "$\theta_{in}$", an operation of summating the rotor angular velocity "$\omega$" and a synchronous velocity "$\omega_m$", and an operation of integrating a sum value obtained by summating the rotor angular velocity "$\omega$" and the synchronous velocity "$\omega_m$" to calculate the rotation angle "$\theta_{out}$" from which the pulsation has been removed. In this case, the synchronous velocity "$\omega_m$" may be obtained by filtering, through a low pass filter (LPF), a frequency of an output pulse representing the rotation angle "$\theta_{in}$" measured by the sensor and a rotor angular velocity calculated from a stimulus number of the motor.

According to the embodiments of the present invention, a pulsation included in an angle measured by a GMR sensor may be removed by using a PLL, thereby stabilizing and enhancing a motor output.

The sine value calculator 110, the cosine value calculator 120, the D-Q converter 130, the proportional integral (PI) controller 140, the adder 150, the integrator 160 and the PLL block 170, and/or one or more components of these 110, 120, 130, 140, 150, 160, and 170 may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the various components 110, 120, 130, 140, 150. 160, and 170 and/or one or more components of thereof may include or otherwise be associated with one or more memories (not shown) including code (e.g., instructions) configured to cause the various components 110, 120, 130, 140, 150, 160, and 170 and/or one or more components of thereof to perform one or more of the features, functions, processes, etc., described herein.

The memories may be any medium that participates in providing code to the one or more software, hardware, and/or firmware components for execution. If implemented in software, the functions may be stored as one or more instructions or code on a non-transitory computer-readable medium or non-transitory processor-readable medium. Such medium or memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device for estimating a rotor angle in a motor, comprising:
   a sensor configured to measure a rotation angle "$\theta_{in}$" of the motor including a pulsation;
   a D-Q converter configured to convert the rotation angle "$\theta_{in}$" into a D-axis conversion angle; and a phase-locked loop (PLL) block configured to perform proportional integral control on the D-axis conversion angle according to a PLL algorithm to estimate a rotation angle "$\theta_{out}$" from which the pulsation has been removed;

wherein the rotation angle "$\theta_{out}$" estimated by the PLL block is fed back to the D-Q converter, and by using a rotation conversion matrix including a cosine function and a sine function for the rotation angle "$\theta_{out}$", the D-Q converter converts the rotation angle "$\theta_{in}$" into the D-axis conversion angle.

2. The device of claim 1, wherein the sensor is a giant magneto resistance (GMR) sensor.

3. The device of claim 1, wherein
the PLL block comprises:
a proportional integral controller configured to perform the proportional integral control for decreasing an estimation error "$\theta_{in}-\theta_{out}$" to 0 to calculate a rotor angular velocity "$\omega$" which is controlled for the rotation angle "$\theta_{out}$" to track the rotation angle "$\theta_{in}$", wherein the estimation error "$\theta_{in}-\theta_{out}$" is included in the D-axis conversion angle;
an adder configured to summate the rotor angular velocity "$\omega$" and a synchronous velocity "$\omega_m$"; and
an integrator configured to integrate a sum value obtained by summating the rotor angular velocity "$\omega$" and the synchronous velocity "$\omega_m$" to calculate the rotation angle "$\theta_{out}$" from which the pulsation has been removed, and
the synchronous velocity "$\omega_m$" is a value obtained by filtering, through a low pass filter (LPF), a frequency of an output pulse representing the rotation angle "$\theta_{in}$" measured by the sensor and a rotor angular velocity calculated from a stimulus number of the motor.

4. The device of claim 3, wherein a gain of the proportional integral controller is a gain when a band value between a frequency band of the synchronous velocity "$\omega_m$," and a frequency band of the pulsation is set to a cutoff frequency.

5. A method of estimating a rotor angle in a motor, the method comprising:
measuring a rotation angle "$\theta_{in}$" of the motor including a pulsation by using a sensor;
converting the rotation angle "$\theta_{in}$" into a D-axis conversion angle representable in a DQ-axis coordinate system; and
performing proportional integral control on the D-axis conversion angle to estimate a rotation angle "$\theta_{out}$" from which the pulsation has been removed;
wherein the step of converting comprises the steps of:
feeding back the rotation angle "$\theta_{out}$";
generating a rotation conversion matrix including a cosine function and a sine function for the rotation angle "$\theta_{out}$"; and
converting the rotation angle "$\theta_{in}$" into the D-axis conversion angle including an estimation error "$\theta_{in}-\theta_{out}$" between the rotation angle "$\theta_{in}$" and the rotation angle "$\theta_{out}$" by using the generated rotation conversion matrix.

6. The method of claim 5, wherein the measuring comprises measuring the rotation angle "$\theta_{in}$" by using a giant magneto resistance (GMR) sensor.

7. The method of claim 5, wherein
the estimating comprises:
performing the proportional integral control for decreasing an estimation error "$\theta_{in}-\theta_{out}$" to 0 to calculate a rotor angular velocity "$\omega$" which is controlled for the rotation angle "$\theta_{out}$" to track the rotation angle "$\theta_{in}$", wherein the estimation error "$\theta_{in}-\theta_{out}$" is included in the D-axis conversion angle;
summating the rotor angular velocity "$\omega$" and a synchronous velocity "$\omega_m$"; and
integrating a sum value obtained by summating the rotor angular velocity "$\omega$" and the synchronous velocity "$\omega_m$" to calculate the rotation angle "$\theta_{out}$" from which the pulsation has been removed, and
the synchronous velocity "$\omega_m$" is obtained by filtering, through a low pass filter (LPF), a frequency of an output pulse representing the rotation angle "$\theta_{in}$" measured by the sensor and a rotor angular velocity calculated from a stimulus number of the motor.

8. The method of claim 5, wherein a gain of the proportional integral control is a gain when a band value between a frequency band of the synchronous velocity and a frequency band of the pulsation is set to a cutoff frequency.

* * * * *